United States Patent [19]

Cunningham et al.

[11] Patent Number: 5,008,519

[45] Date of Patent: Apr. 16, 1991

[54] FOOLPROOF COUPON REDEMPTION SYSTEM

[76] Inventors: William R. Cunningham, P.O. Box 500, Anna, Ill. 62906; Carmelo S. Amareno, 3775 Bay Rd., Menlo Park, Calif. 94026; Helmut Kayan, 222 Scenice Dr., Redwood City, Calif. 94062

[21] Appl. No.: 272,176

[22] Filed: Nov. 16, 1988

[51] Int. Cl.⁵ .......................................... G06K 15/00
[52] U.S. Cl. .................................. 235/383; 235/487 235/487
[58] Field of Search ...................... 235/383, 385, 487; 283/56

[56] References Cited

U.S. PATENT DOCUMENTS

| | | |
|---|---|---|
| 11,604 | 1/1880 | Hake . |
| 3,108,824 | 10/1963 | Fischer et al. . |
| 3,211,470 | 10/1965 | Wilson . |
| 3,245,534 | 4/1966 | Smith et al. . |
| 3,711,683 | 1/1973 | Hamisch, Sr. . |
| 3,959,624 | 5/1976 | Kaslow ........................ 235/61.11 E |
| 4,540,880 | 9/1985 | Hipko .................................. 235/487 |
| 4,554,446 | 11/1985 | Murphy et al. ...................... 235/487 |
| 4,634,147 | 1/1987 | McClure ............................... 283/56 |
| 4,791,281 | 12/1988 | Johnsen et al. ..................... 235/383 |

OTHER PUBLICATIONS

"Information Manual, Couponing", by The Lempert Company, 1987.

"UPC Coupon Code Guidelines Manual", Uniform Code Council; Oct., 1987.
"TRANZiT 1800" product literature, VeriFone, Inc.; 1987.
"TRANZ 340" product literature, VeriFone, Inc.; 1987.
"VISION 500—The Coupon Eater", promotional literature; Advanced Promotion Technologies; 1988.

Primary Examiner—Harold Pitts
Attorney, Agent, or Firm—Milton S. Gerstein; Marvin Benn

[57] ABSTRACT

A manufacturers' coupon redemption system that is electronically controlled, and compatible in any supermarket using Universal Product Codes. The system includes a newly-styled, uniform coupon, with special bar code indicia redeemable on up to three families of products. At the supermarket, a special device for reading the coupons is provided that reads the coupons presented by the consumer. The system verifies that the consumer did, in fact, purchase the items specified, that the coupon has not expired, and other validation conditions. The unit communicates the results of the validation to the cash register for credit to the consumer's bill. The accepted coupon is then mutilated to prevent reuse. The reader devices, and the in-store controller, are under the jurisdiction of the coupon clearing house, thus enabling the clearing house to electronically poll the coupon redemption data by computer directly from the stores, and to immediately produce tallies and totals for the purpose of immediate billing of the manufacturers and crediting of the retailers.

37 Claims, 12 Drawing Sheets

FOOLPROOF COUPON REDEMPTION SYSTEM

BACKGROUND OF THE INVENTION

The world of product marketing is highly intense and competitive, with the understood intent to increase the gross sales of a given product. Among the many calculated strategies manufacturers utilize to this end is the dissemination of "cents-off" coupons. This technique benefits all parties concerned, the manufacturer, the retailer, and the consumer. The manufacturer gains as his product is publicized, although he must sacrifice some of his profits. The retailer is happy as consumers comb his store in search of the item being discounted. And, of course, the thrifty consumer is the most eager of all as he saves some money at the check out. However, as might be expected, at least two major and ominous problems come on the scene to greatly complicate things.

Firstly, the implementation of coupons is an enormous and tedious business. According to figures supplied by the A.C. NIELSEN COMPANY, coupon distribution reached a peak of 179.8 billion in 1985, which was double the 1980 figure of 90.6 billion. Consumers redeemed 6.25 billion coupons in 1984, a 12% increase over 1983, and saved a total of $2.06 billion on their shopping bills. Yet, unbelievably, from the consumer's redemption of the coupon through the retailer's reimbursement, counting the coupons is done by hand! The check-out clerk, to whom a coupon is presented, must "manually" look over the coupon, which not only wastes precious check-out line time as the clerk must carefully look over the coupon, but also reduces accuracy of the operation. Examples of potential error may include overlooking an expiration date, or overlooking the exact product specification for which the coupon is valid, i.e. only a certain size package may be stipulated on the coupon.

Next, the store manager's daily duties include collecting and tracking the coupons redeemed in his store. In a large supermarket, there is likely to be a large volume of coupons redeemed, resulting in a substantial amount of manual, time-consuming, and error-prone work. The coupons are then generally passed on to a third party, referred to as a coupon clearing house, which processes the coupons received from many retailers, pertaining to a multitude of manufacturers. However, this too, is all done by hand! Typically, the sorting and counting work is done out of the country, where it may be done more cheaply, and the results returned to the U.S. for billing the manufacturer and crediting the retailers. As would be expected, this very loose loop inevitably results in the retailers claiming they are under-credited, and the manufacturers claiming over-billing.

Thus far, only half of the problem has been addressed. Another obstacle of substantial proportion, which threatens the overall productivity and efficacy of coupon usage, is that of fraud. One estimate of fraudulent coupon redemption given a few years ago is that at least $350 million a year is lost through coupons unlawfully redeemed. Such swindling can take place in a number of ways. Firstly, an overbearing customer can intimidate a young cash register operator into accepting a coupon for the wrong size product, for a different brand, or for an entirely different product. Particularly in larger and busier stores, the register personnel may have the opportunity to slip a stack of their own coupons into the cash register and exchange them for cash. Also, the retailer can accumulate, through any number of methods, quantities of coupons and present them to the coupon clearing houses for payment. The vain warning which appears on many coupons, "Invoices showing purchase of adequate stock to cover all coupons redeemed must be shown upon request," would be so astronomically costly to enforce, that there is much room for coupon cheating.

Although inventions have surfaced which address different deficiencies of the current couponing system, none have solved all of the problems. The present invention introduces an accurate and fast mode of coupon redemption at the check out, foolproof cancellation of a redeemed coupon preventing reuse, electronic tabulation of coupon redemption which will eliminate the need for tedious and less reliable hand-tallying of coupons, and the establishment of a reliable audit trail to the purchaser's transaction for verifying compliance with the terms of the coupon.

SUMMARY OF THE INVENTION

The present invention originates with specially formatted coupons designed for the redemption system now in use. These coupons may be distributed in the usual manner or, as a provision of the current invention, be organized into a periodic publication for free distribution through the media or for sale to the consumers.

The present invention will be usable in all supermarkets equipped with "Universal Produce Code" (UPC) product control cash register systems. The next component is a coupon reading unit. One such unit will be connected to each cash register in the equipped supermarket. As the customer's items are read into the cash register, each item's UPC codes will also be inserted into the memory of the coupon reader. When all of the products have been entered, the cashier will feed the coupons presented by the customer into the reader to verify that the specified item was purchased by this customer, and, if so, notify the cash register of the credit due on the bill. The coupon will then be rendered unusable, and the accepted coupon transaction with the coupon reader controller unit located in the store will be recorded. Thus, fraudulent redemption of coupons by customers or cashiers is eliminated, as well as human error and the time involved to manually do the job.

It must be stated that a prime necessity of the current invention is that the coupon reading devices and the coupon data processor are under the jurisdiction of a third party, namely, a coupon clearing house. The aim of this detail is that retailers no longer have a hand in the redemption process, eliminating any possibilities of tampering on their part.

The coupon clearing house then electronically polls the coupon data processors at all of the retailers served by that clearing house, and compiles exact figures as to dates, places, and total amounts of all coupon redeemed for that area, and presents an exact bill to the manufacturer for immediate reimbursement to the retailers. Thus eliminated is the high cost, time interval, and error factor involved with the current procedure of shipping tons of coupons out of the country for hand processing.

BRIEF DESCRIPTION OF THE DRAWINGS

The invention will be more readily understood with reference to the accompanying drawings, wherein.

DETAILED DESCRIPTION OF THE INVENTION

Figure 6A:
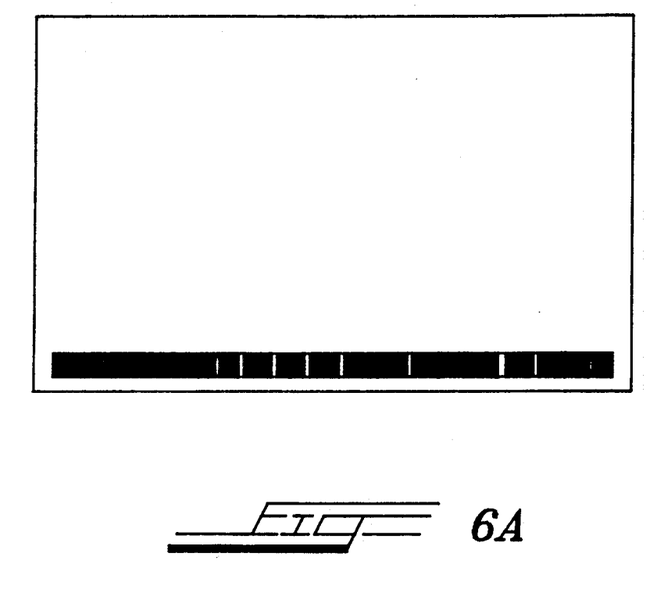
FIGS. 6A and 6B depict a general coupon in format readable according to the present invention.
Figure 6B:
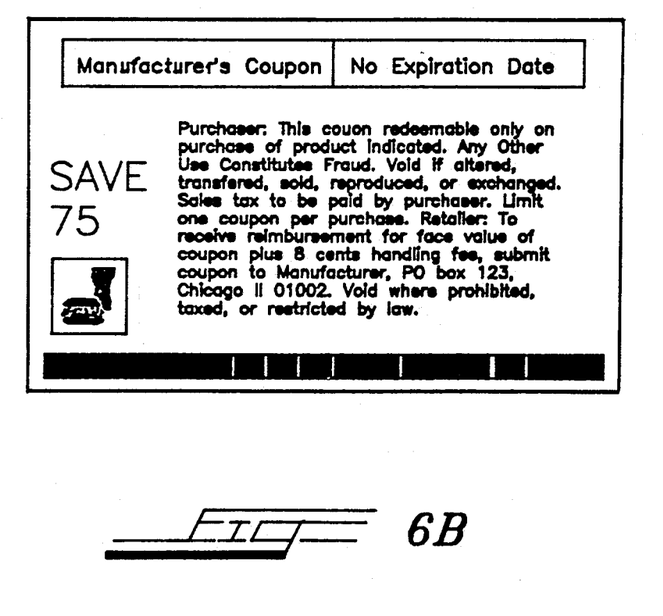

The special coupon of the invention is indicated by reference numeral 14, as shown in FIG. 6. The coupon 14 is of a uniform size, and may contain the usual product pictures and wording as currently shown on coupons, but must have a bar-code strip unique to the present invention along a side edge of the coupon. (The coupon may contain the currently implemented coupon UPC somewhere else on the coupon to retain compatibility on UPC systems not equipped with the present invention.) The bar code strip is made up in the following manner:

3 9 (special code, 2 digits),
Begin Character (1 digit),
Merchant Number (5),
Manufacturer Number of UPC code (5),
Manufacturer Marketing Code (6),
Expiration Date (MMYY) (4),
Minimum Purchase Quantity (1),
Limit per Purchase (1),
Coupon Value (3),
Purchase Item (5),
Purchase Item (5),
Purchase Item (5),
Digit Check (1),
End Character (1).

The presence of the "Begin Character" and "End Character" delineate in which order the data has been laid down, and thereby permit bi-directional reading of the coupon. "Purchase Quantity" refers to the number of packages required to validate the discount offer. The 3-digit "Coupon Value" denotes the value of the coupon and is in increments of 5 cents. Thus, the range of the coupon is through $49.95. The three fields for "Purchase Items" allow for three 5-digit UPC codes of the product which is discounted through the coupon. In actuality, however, three families of products are thusly covered due to the structure of the UPC codes currently employed. Using this structure, the first three digits refer to the general name of the product, and the next two digits will serve to delimit the exact product. For example, the fourth digit denotes the package size and the last digit denotes which of the available flavors that package contains. The coupon "Purchase Item" codes have the ability to contain a "wild-card character," that is, say, a dash instead of a number for these digits. Wild card characters have the function to act as a match for any character. Therefore, if the UPC for Elsie's Ice Cream was 123xx, where the last two digits on any carton would designate the exact package size and the flavor, then a coupon purchase item code of 123—would give the coupon validity on any package of Elsie's Ice Cream. Or, for example, 1232—might be a coupon code to allow for any flavor of the ice cream that is in a 2 or larger size container, thus not allowing the use of the coupon on an individual ice cream cone.

As previously mentioned, each electronic cash register(ECR) in the UPC supermarket will be connected to a coupon reading device of the present invention. As the cashier scans each purchase item, not only does the store computer process the purchase and tally all of the items, but the coupon reader unit of the invention will also keep in memory a listing of the UPCs of all of the customer's purchases. Also, along with the purchase record, a flag is created, so that, if the coupon is accepted for a particular product, another coupon cannot be accepted for the same product, either intentionally or accidentally. After the customer's purchases have been scanned, all coupons presented for credit and validated are automatically credited.

Figure 5A:
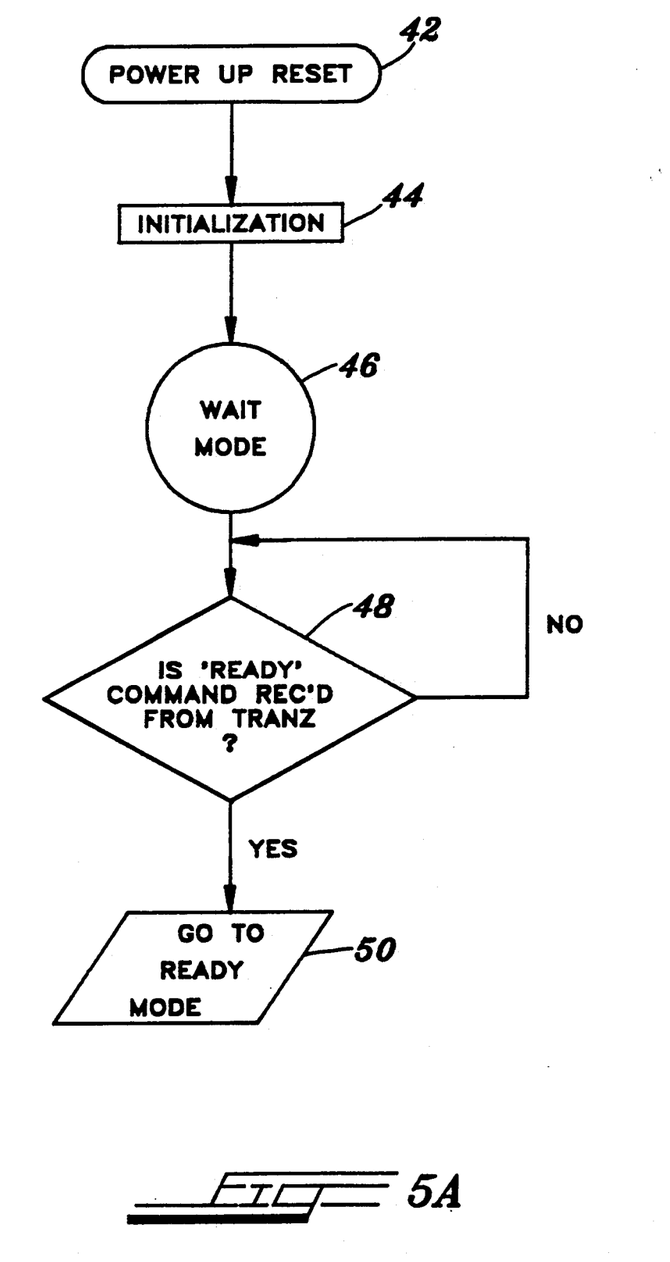
FIGS. 5A through 5E depict sequential flow charts of the present invention.
Figure 5B:
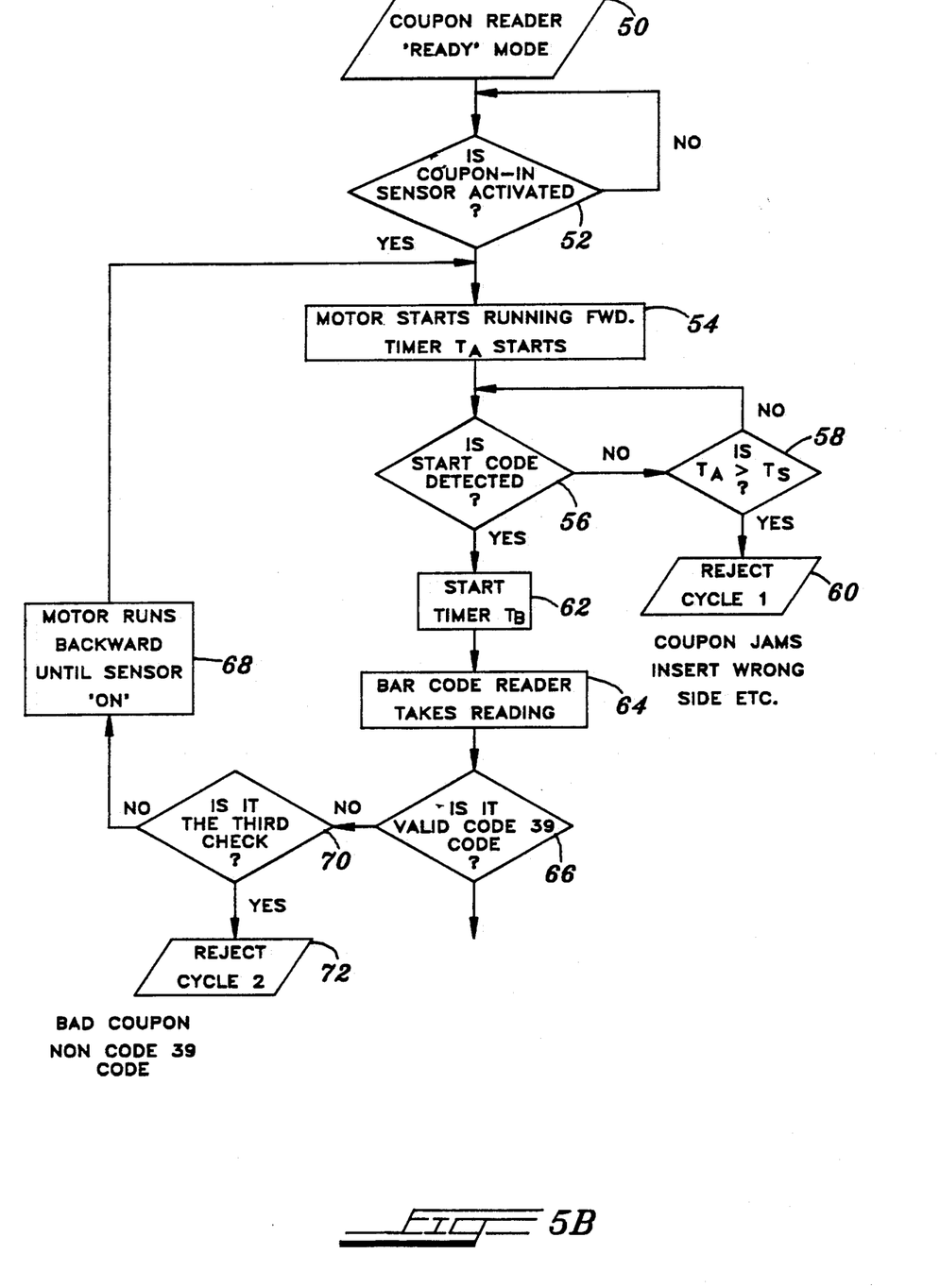

Referring now to the flow sequence shown in FIG. 5A, when the instant invention is turned on (Block 42), the coupon reading device steps through a conventional initialization procedure (Block 44), upon completion of which the device is placed in a "wait mode" (Block 46). The "wait mode" signifies the device is fully operational and awaiting a signal (Block 48) from the cash register nexus to step the device from the "wait mode" to a "ready mode" (Block 48). For instance, when the cash register begins to total a customer's items, the cash register is placed into an operational mode which would signal the device to be "ready" (Block 50) for its primary function of reading discount coupons upon insertion therein. The device is inactive while the store clerk is inserting the pertinent information of the customer's purchases into the ECR's memory. Referring to FIG. 5B, operation of the device begins by means of inserting a coupon 14 (FIG. 6) into the coupon-reading device of the invention, whereby a conventional coupon-sensor mechanism 52 is activated, triggering timer T(a) (Block 54), thereby supplying current to a reversible motor, which then operates in a forward mode, drawing the coupon into the device. As the coupon is being drawn into the device, T(a) continues counting down as the device searches for the "start" code (Block 56). If T(a) exceeds a preset time T(s) before the "start" code is detected, then reject cycle (Block 60) is initiated due to the presumption that a coupon has jammed or was incorrectly inserted. For example, if a coupon is inserted with the bar codes facing down, the coupon will not trigger the bar-code optical sensor within the preset time T(s). Therefore, a rejection sequence (Block 60) of the coupon is initiated. If the coupon becomes jammed in the insertion chamber, the device will quickly determine the situation and reject the coupon.

When a valid start code is detected before T(s) lapses, timer T(b) (block 62) is triggered, with the optical scanner taking a bar-code reading (block 64). The optical scanner first searches (block 66) for a valid 2-digit code "39" that is well-known and conventional, which is described in the above coupon-description and made part of the bar code. If no valid Code "39" is detected, the current to the motor is reversed (block 68) until the coupon is ejected far enough to reactivate the coupon-sensor, whereby the motor is again forwarded, thereby reactivating T(a) for a second attempt at finding a valid code "39." This subroutine also requires that the coupon be subjected to the earlier requirement of "start code" detection or be rejected (block 60). If a valid start code is again detected before T(s), then the optical scanner makes a second attempt at reading the bar code for a valid code "39." The device will complete this subroutine three times (block 72), and if, after the third attempted reading no valid code "39" is found, the second reject cycle (block 72) is initiated, which interprets the coupon as being either bad or a non-code "39" coupon, i.e., non-compatible coupons for the system.

Figure 5C:
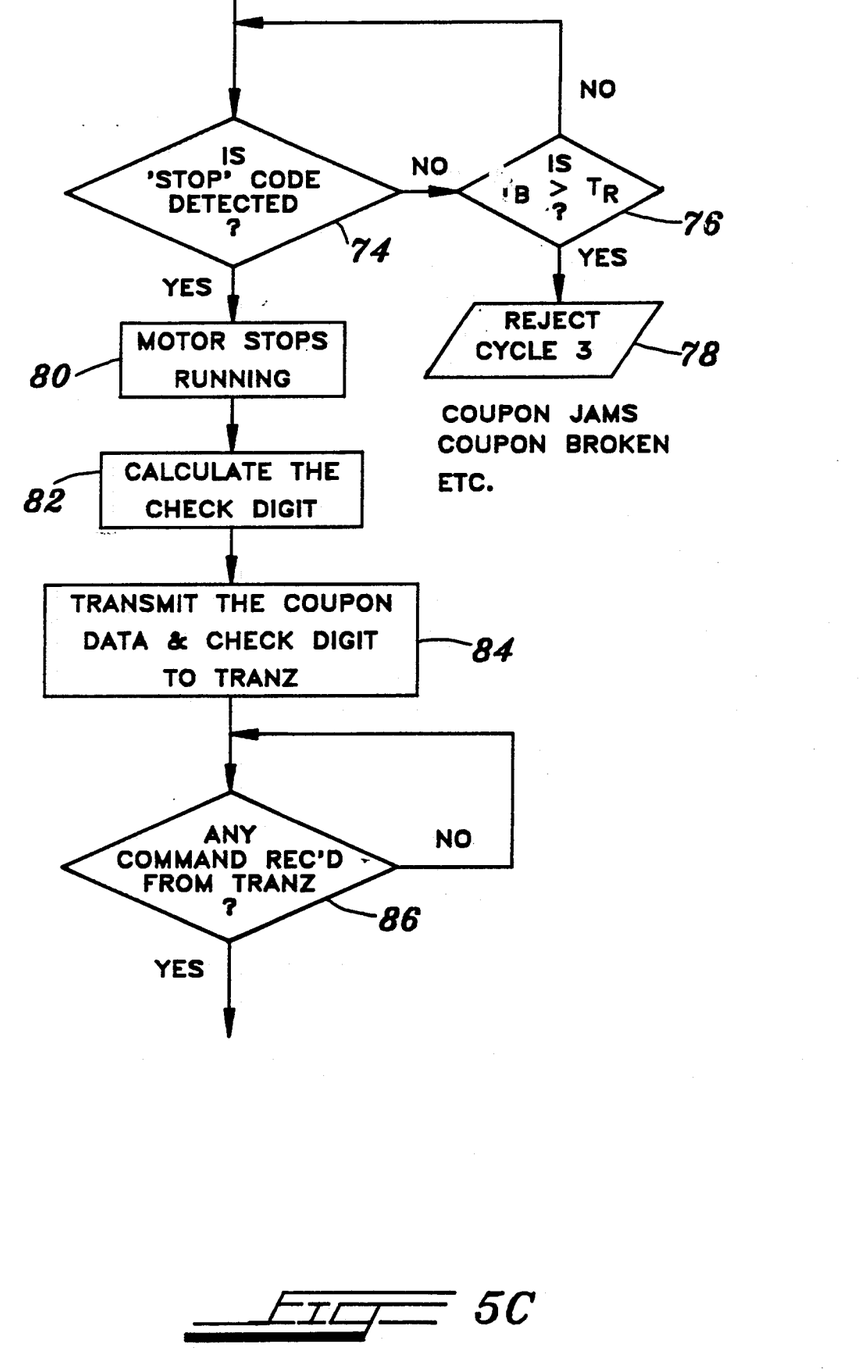

Referring to FIG. 5C, if a valid code "39" is detected, but a "stop code" (block 74) is not found before T(b) exceeds T(r) (block 76), then the present invention would interpret the coupon as either jammed or broken, and would initiate a third reject cycle (block 78). If a valid code "39" is found, along with a valid "stop code," then the current to the electrical motor is stopped (block 80) and the device calculates the check digit for a parity check (block 82) and transmits (block 84) all data read from the bar code to the ECR. The validation process first verifies that the UPC code(s), for which the coupon was issued, do indeed appear on the listing of products purchased by the customer, and the required minimum amount, if applicable. Furthermore, the device ascertains whether the coupon has expired, whether the limit per purchase has been exceeded, and whether the coupon is intended for use at the retailer where it has been presented. The unit sets a flag for each purchased item in the ECR's corresponding to the validated coupon, thus preventing a similar coupon from being validated against that item. In addition, the unit further communicates to the cash register the proper amount of credit to the consumer's bill.

Figure 5D:
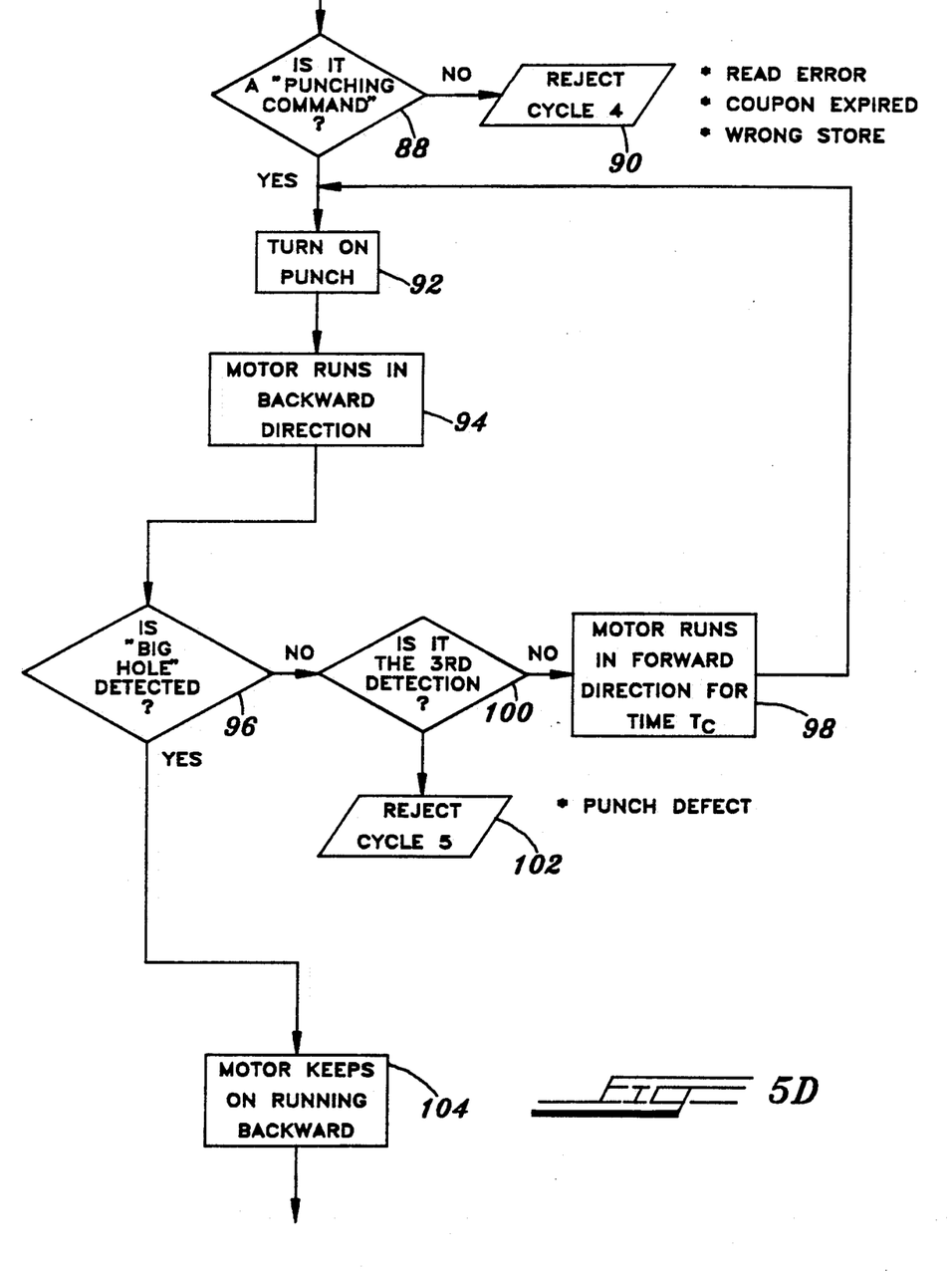
Figure 5E:
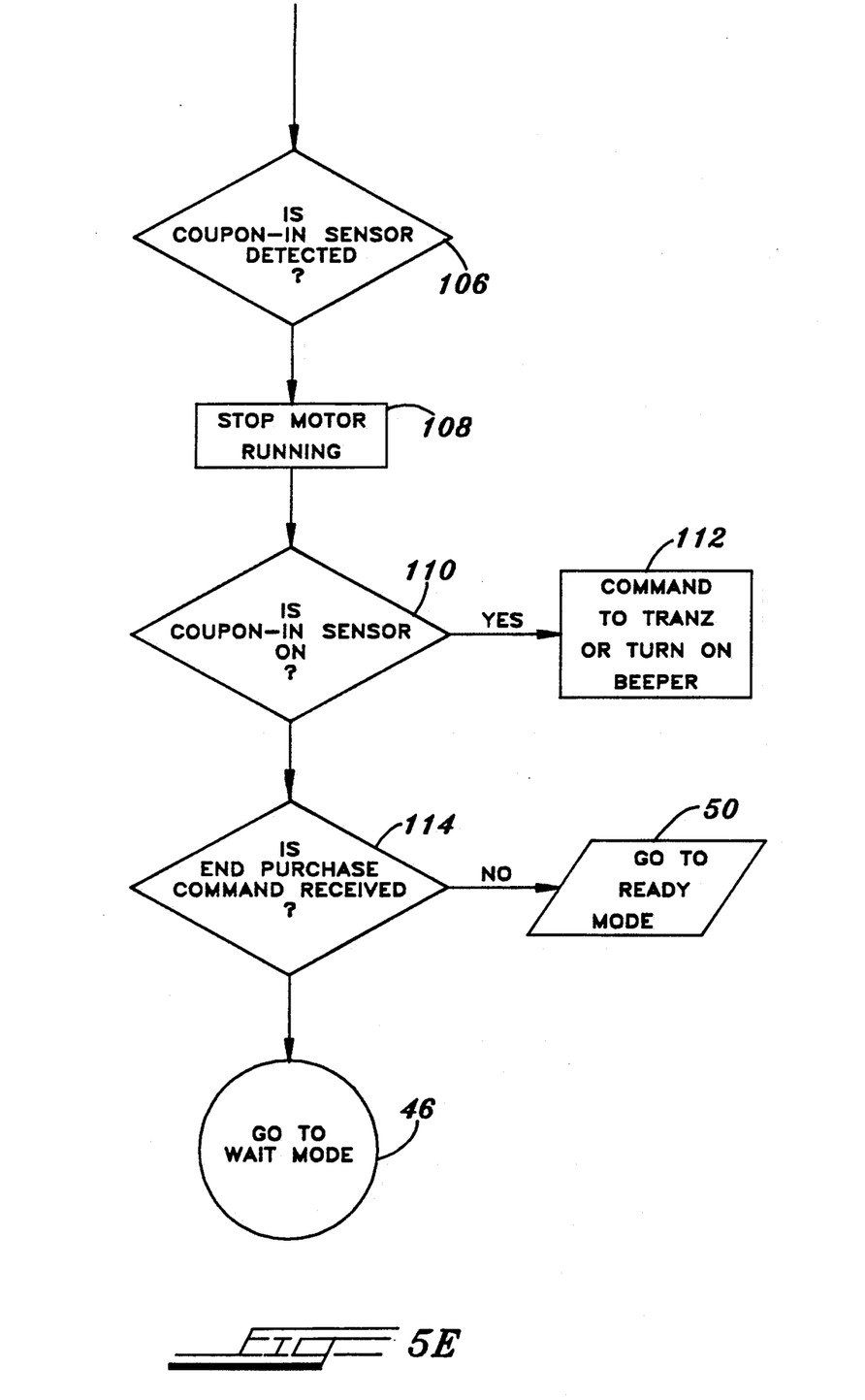

Referring to FIG. 5D, if the device receives any command other than a punching command from the cash register, the coupon is considered invalid and the device initiates reject cycle (block 90). For example, if the coupon has expired, is designated for a different store, or there is just a general read error, then the coupon is rejected. Upon the successful transmission of all data, the cash register forwards a punching command (block 88), whereby a punching device is employed (block 92) to punch a hole in the bar-code strip, thereby rendering the coupon unreadable to another reading unit, and visually designating it as being cancelled. Upon retraction of the spring-loaded solenoid punch, the motor is reversed (block 94) to draw the coupon back to the optical sensor for detection of a mutilated bar code, indicating a correctly punched coupon. If no hole is detected, the motor (block 96) runs forward for time T(c) (block 98) until the coupon is positioned beneath the punch again, whereupon the punch is activated and the motor is again reversed, to bring the coupon to the optical sensor. The device performs up to three such subroutines, in order to verify whether a coupon has been punched, before it initiates a reject cycle (block 102), which signifies that the punch is defective. If a punched hole is detected, the motor keeps running backward (block 104) until the coupon triggers the coupon sensor (block 106) (FIG. 5E), which stops the current to the motor 108 and signals the event (block 112) by a beeper or, alternatively, by command to the cash register. It is to be noted that the device can deposit the coupons into an internal paper tray by forwarding the motor a set time, thereby freeing the clerk of further manipulation of the expired coupons. Unless an end-of-purchase command (block 114) is sent by the cash register, the device is maintained in the ready mode (block 50) for insertion of the next coupon to be validated. Once an end-of-purchase command is received (block 114), the process is complete with regard to this customers purchases, and is returned to the "wait mode" (block 46).

The Coupon Read cycle allows additional coupons to be read for the current customer, whereby the same process takes place for each coupon. As the coupons are read, valid coupons are credited to the customer's bills, while invalid coupons result in descriptive diagnostic messages appearing on the cash register which explain the reason why each coupon was not accepted, i.e., due to a read error, expiration of the coupon, or the particular product was not purchased, etc. The coupon-reader unit of the invention may also be equipped with a display of its own to indicate the results of any unacceptable coupons. The ECR will indicate to the reader unit when the customer has paid, and that the transaction has been completed. The reader unit will then clear its memory in expectation of the next customer. At this stage, the device will also communicate the transaction to the in-store central processor. Data recorded during this step includes the date and time of each coupon transaction, the cash register/purchase identification number, the redeemed coupon's UPC number, and the amount of the discount. At chosen time intervals, the coupon-clearing house is able to electronically poll the controller units 18 of all of the locations served by that clearing house, and thus obtain an exact detailed description of each and every coupon-redemption for each store, as well as produce immediate analysis of the data for speedy reimbursement to the retailer and billing of the manufacturer.

Figure 1:
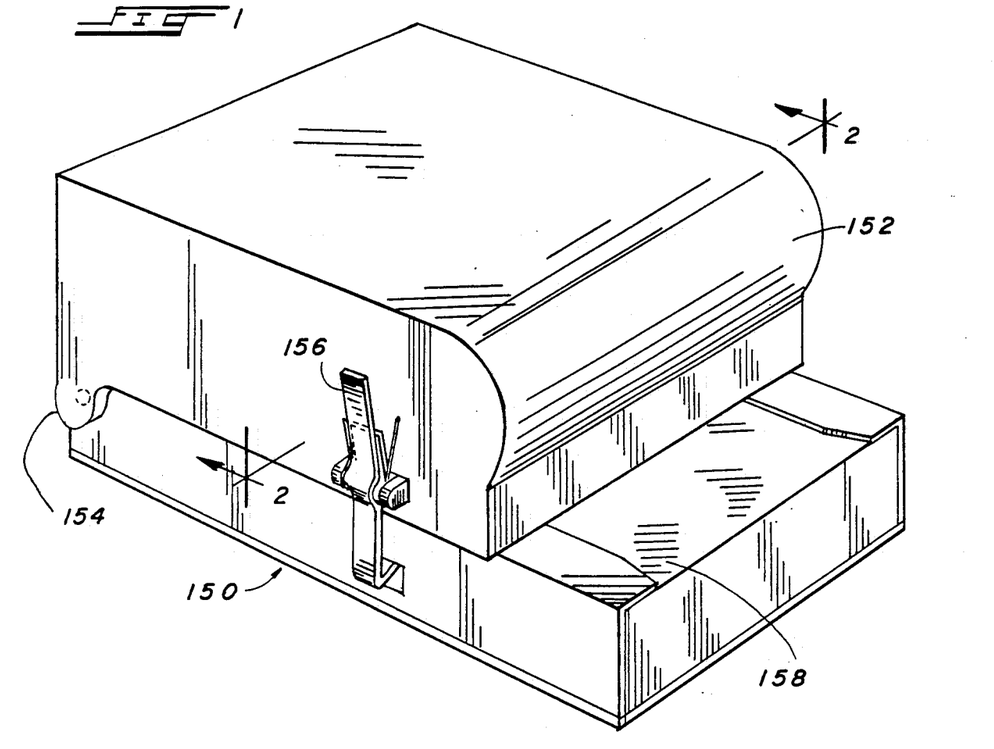
FIG. 1 depicts a pictorial view of the coupon reader as enshrouded by a latchable one piece cover.
Figure 2:
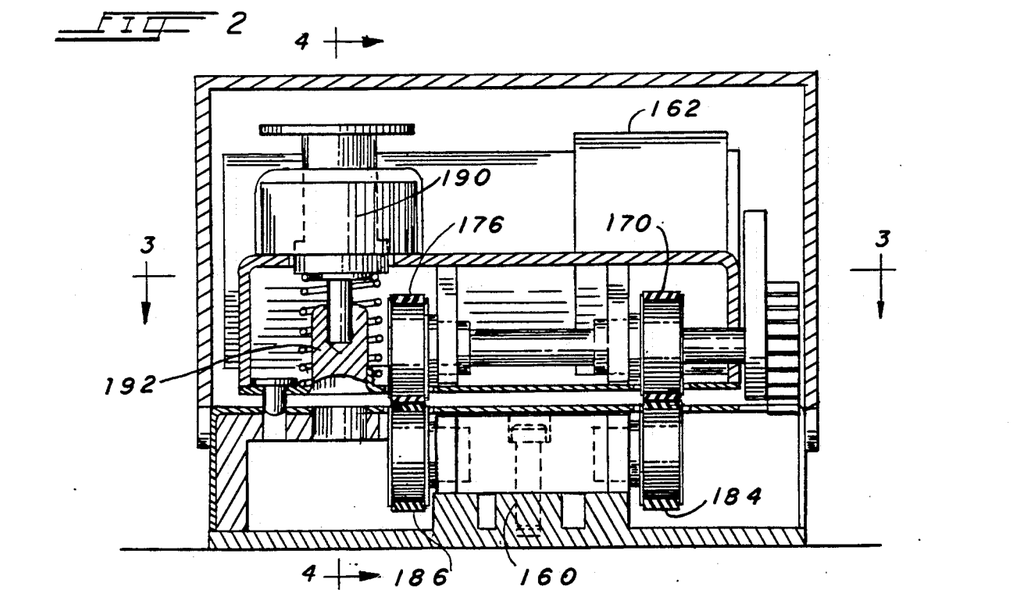
FIG. 2 is a cross-sectional view of the present invention taken along line 2—2 of FIG. 1.
Figure 3:
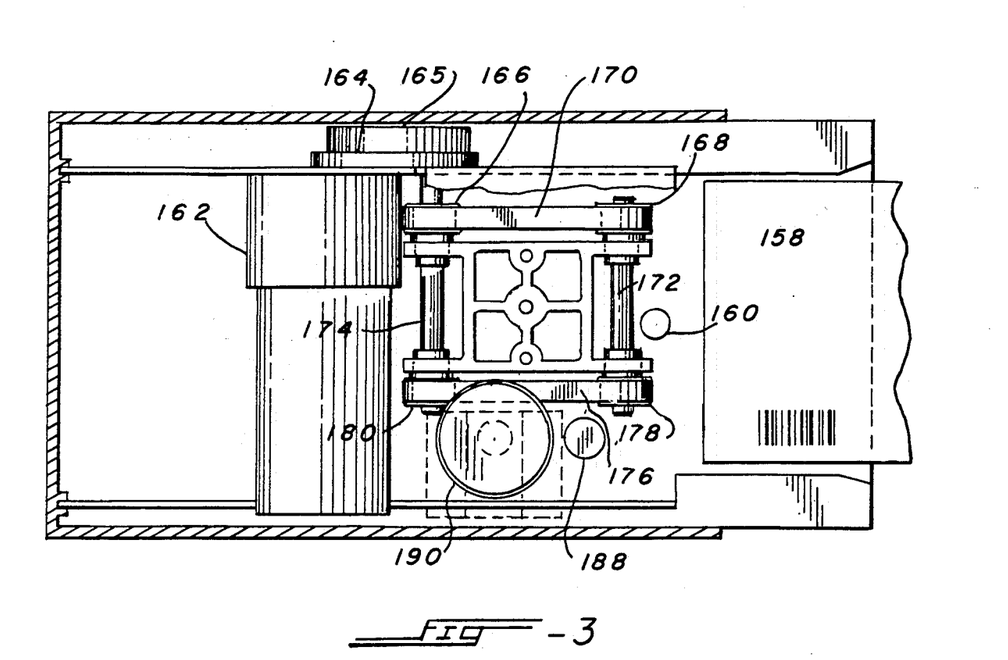
FIG. 3 is a cross-sectional view of the present invention taken along line 3—3 of FIG. 2.
Figure 4:
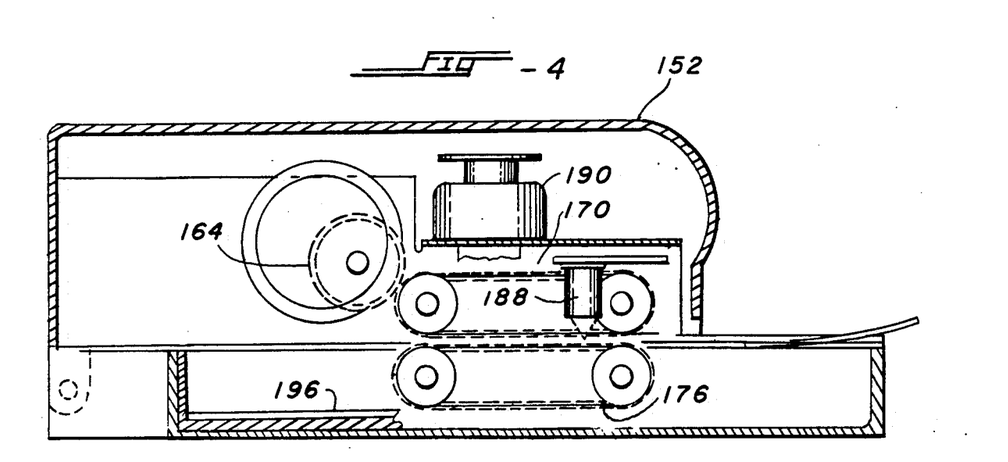
FIG. 4 is a cross-sectional view of the right side of the present invention depicting the tractor belts and optical reader taken along line 4—4 of FIG. 2.

With respect to the reader device, reference is had to FIGS. 1 through 4, in which the coupon-reader device 150 is provided with a shroud 152 that tilts up via hinges after latches 156 have been released to reveal the mechanics of the device. Once the instant invention is turned on, has gone through its conventional initialization procedure, and is in a "ready mode," the device becomes operational by means of inserting a coupon into the device's coupon guide 158, and sliding the coupon in the direction of the shroud 152, until a conventional sensor 160 (as shown in FIG. 2) is activated, thereby triggering timer T(a). Power is then supplied to a reversible motor 162, which directly rotates a gear 164, which in turn rotates gear 165 of shaft 174, which is coupled to a shaft 172 by upper tractor belts 170, 176 via pulleys 166, 168 and 178, 180. Superstructure 182 provides the support for the upper tractor belts 170 and 176 that, in turn, mesh with lower tractor belts 184 and 186. The coupon is drawn into the device between the upper and lower tractor belts to position the bar code beneath the optical scanner 188. As the coupon is drawn into the device, timer T(a) starts counting down as the optical scanner and the device search for the "start" code on the coupon bar code. If T(a) exceeds a preset time T(s) before the "start" code is detected, a first reject cycle is initiated, and the motor 162 is reversed. When a valid "start" code has been detected before T(a) lapses, timer T(b) is triggered as the optical scanner 188 takes a bar-code reading. The optical scanner 188 searches for a conventional valid 2-digit code "39," which is part of the bar code. If no valid code "39" is detected, the current to the motor 162 is again reversed until the coupon is ejected far enough to reactivate coupon sensor 160, whereby the motor 162 current is again forwarded, thus reactivating timer T(a) for a second attempt at finding a valid code "39." The device will complete the above subroutine three times, and, if there is no valid code "39" found after the third attempted reading, a reject cycle is again initiated to reverse the motor and reject the coupon.

If a valid code is read from the bar code, but a "stop" code is not found before T(b) exceeds T(r), the present invention interprets the coupon as being either jammed or broken, and initiates the third reject cycle described above. If a valid code is read and a "stop" code found, the current to the motor 162 is stopped, the check digit is calculated serving as a parity check, and all data read from the bar code is transmitted to the ECR for proper validation. After all of the data has been transmitted to the cash register, the device waits for a punching command from the register. If the device receives any command other than a punching command, the coupon is considered invalid and the device initiates a fourth reject cycle, as described above. Upon successful transmission of all data, the cash register forwards a punching command, whereby solenoid 190 presses punch 192 through a portion of the bar code, thereby rendering the coupon unreadable to another reading unit and visually designating the coupon as having been cancelled. Upon retraction of the spring-loaded solenoid 190, the motor 162 is reversed, drawing the coupon back to the optical scanner 188 for detection of a mutilated bar code, indicating a correctly punched coupon. If no hole is detected, the motor 162 runs forward for time T(c) until the coupon is positioned beneath the punch 192, whereby the solenoid 190 is re-activated and the motor 162 again reversed to bring the coupon to the optical scanner 188. The device will perform up to three such subroutines in verifying whether a coupon has been punched before the device initiates a reject cycle, as described above, which checks for a defective punch. If a punched hole is detected, the motor 162 keeps running backward until the coupon triggers the coupon-sensor 160, which stops the current to the motor and signals the event by a beeper or, alternatively, by command to the cash register. The device can also be formatted for allowing the punched coupon to be forwarded and deposited into paper tray 196 by operating motor 162 in a forward position.

Unless an end-of-purchase command emanates from the cash register, the device is maintained in the ready mode for insertion of the next coupon to be validated. Once an end-of-purchase command is received, the device is complete with respect to this customer's purchases, and the device is returned to the "wait mode."

Figure 7:
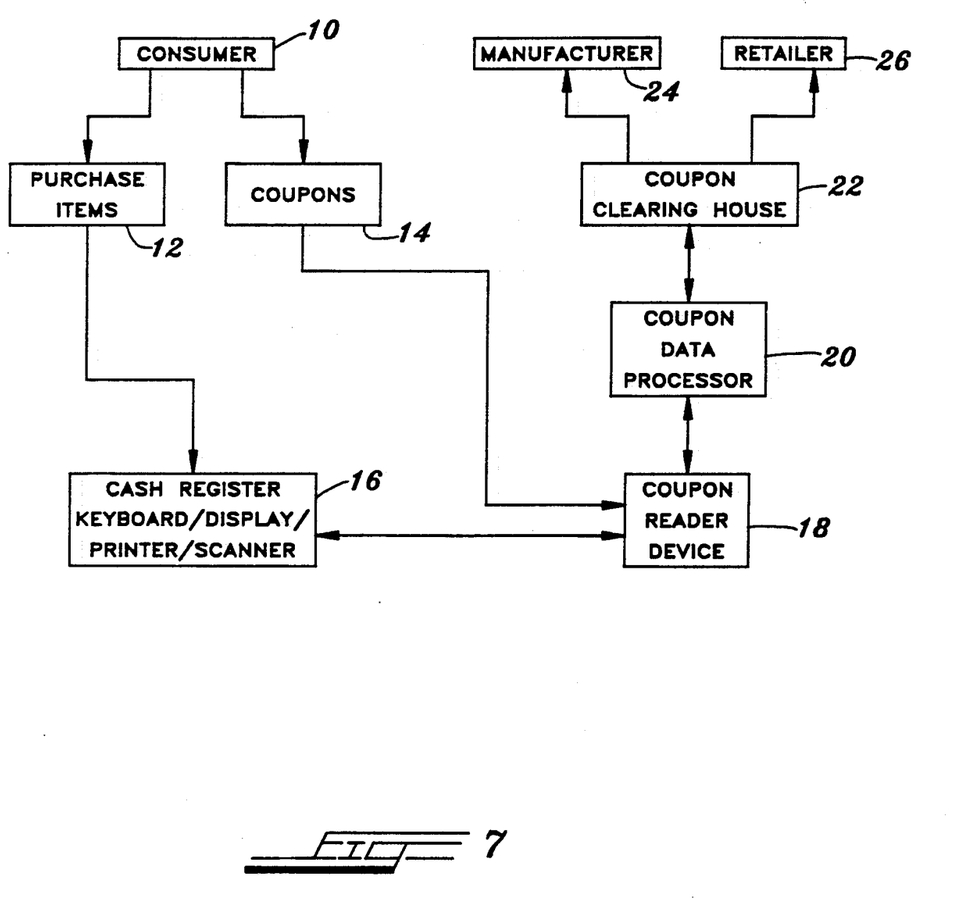
FIG. 7 is a block diagram of the coupon-redemption system according to the present invention.

FIG. 7 shows the overall operation of the system according to the present invention. A consumer (Block 10) purchases and presents items (Block 12) at an ECR(-Block 16) including discount coupons (Block 14), which coupons are inserted, one-by-one, into the coupon reading device 150 of the present invention (Block 18), which, as described above scans the bar code thereof, determines the necessary information and validation thereof, and informs the ECR of such data. Such data is also transmitted to the in-store data processor (Block 20) via a multi-drop local networking transaction terminal (described below) which networks all of the ECRs of the store to such central processor. The data transmitted and stored in the central processor includes the UPC codes of the products, the values of the redeemed coupons, manufacturer of the product, and other pertinent information. Periodically, for example, once a month, a coupon-clearing house (Block 22) will poll the central processor via a phone link, via a controller described below which handles all of the multitude of multi-drop networking transaction terminals serviced by the coupon clearing house, for allowing the transmission of all of the stored data to the clearing house's own central processor, by which the data is sorted and arranged in a desired format for subsequent redemption by the manufacturers (Block 24) and for payments to the retailers (Block 26).

Figure 8:
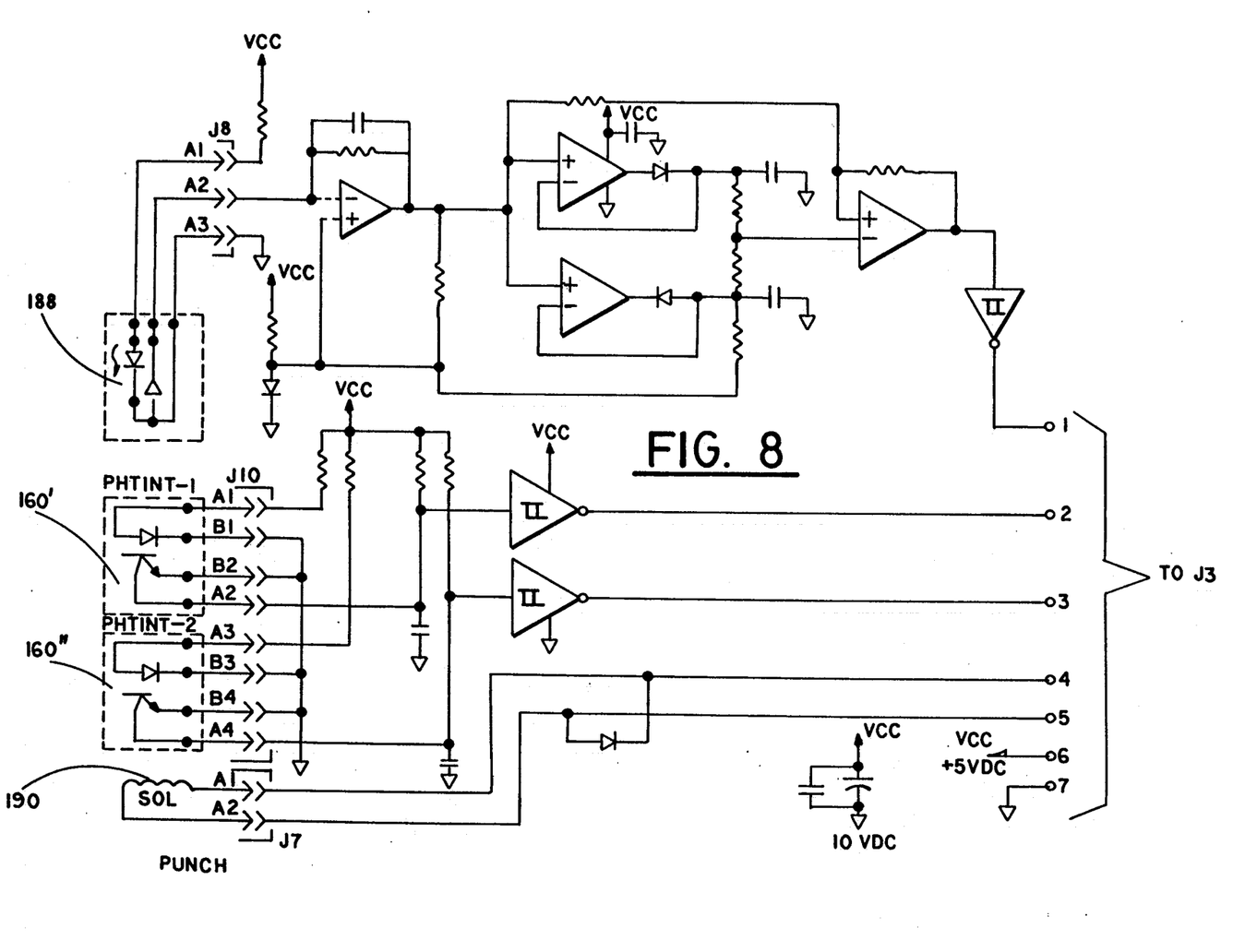
FIGS. 8-10 are electrical schematics of the microprocessor-controlled coupon reading device of the invention.
Figure 9:
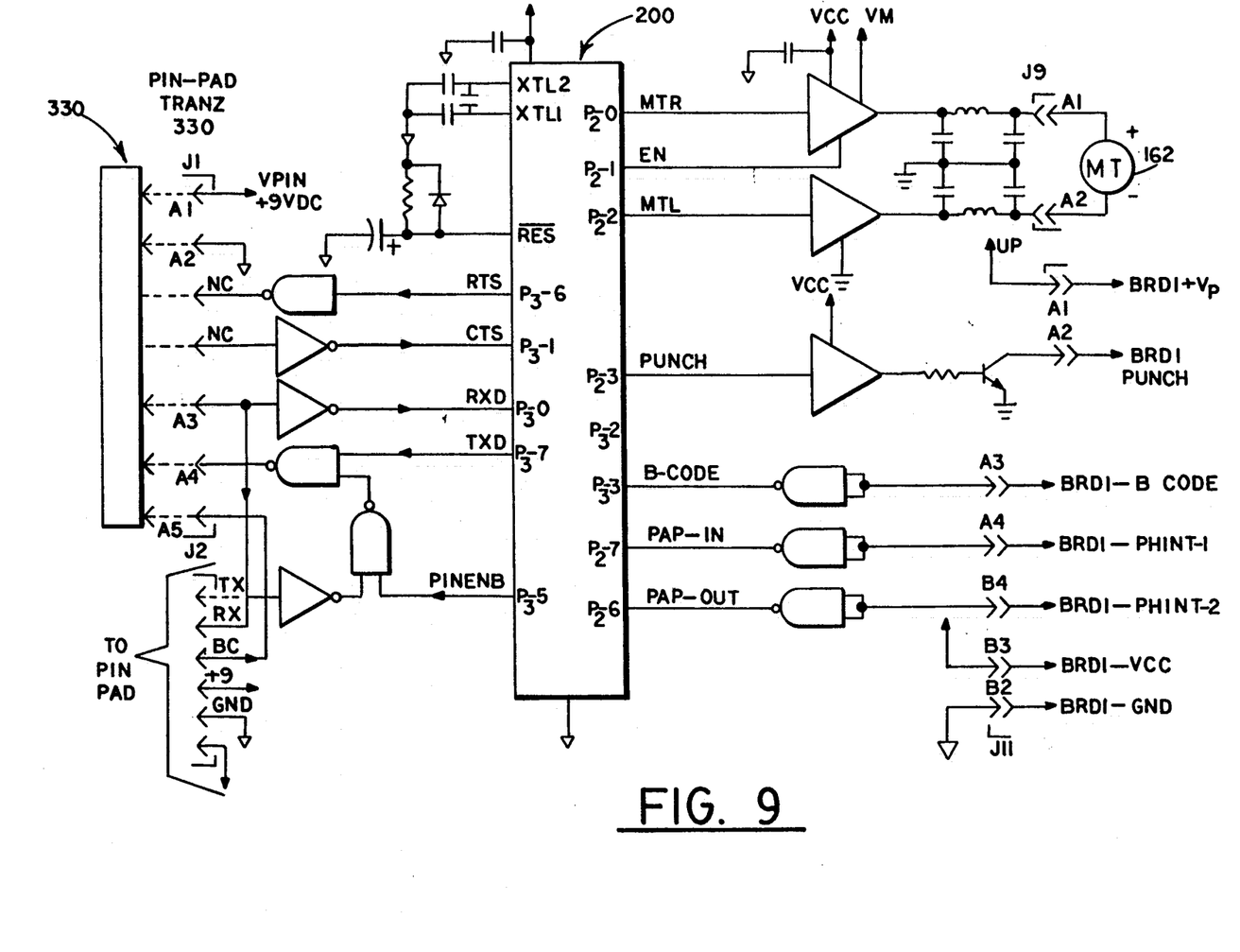
Figure 10:
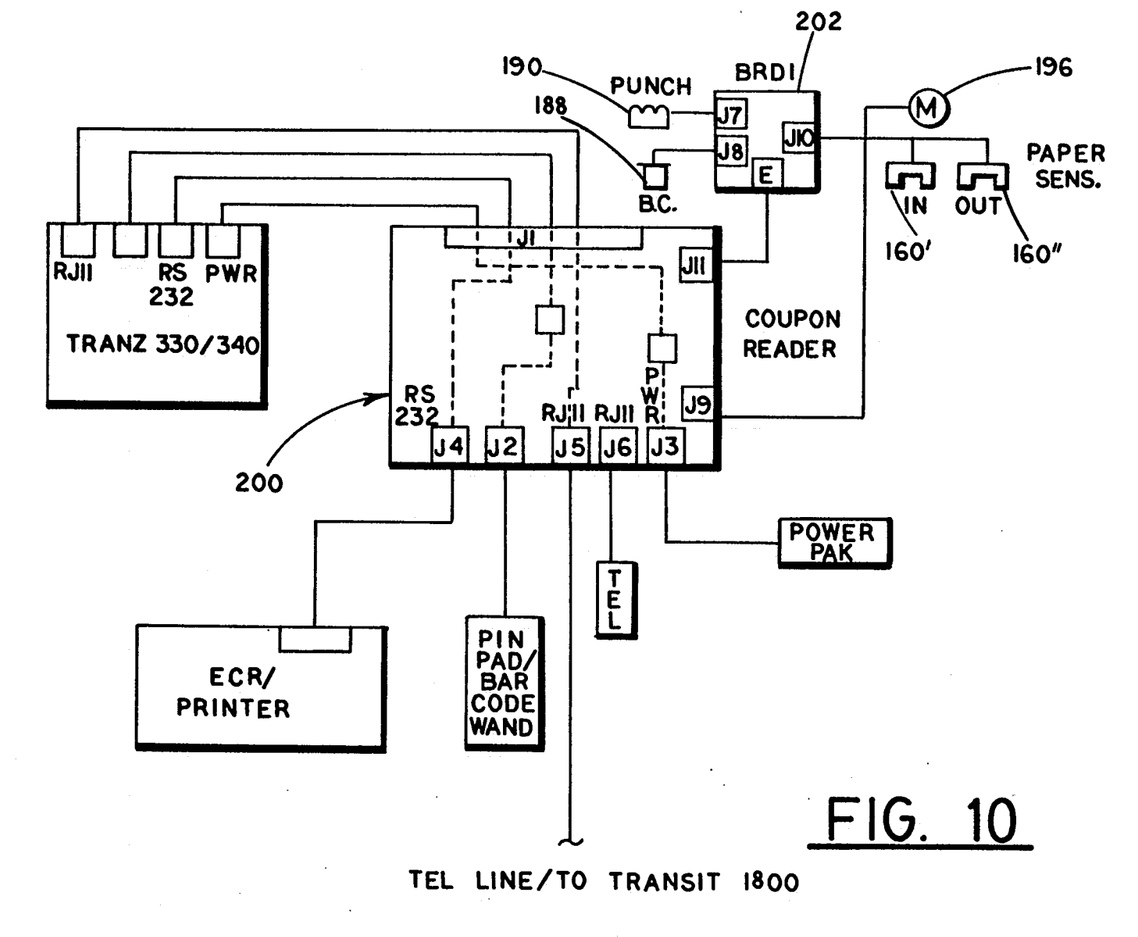

FIGS. 8–10 are schematics of the coupon-reading device and overall system of the invention. The coupon-reading device 150 proper is microprocessor-controlled, as shown in FIG. 9. The microprocessor 200, such as Zilog 8611, through the terminals thereof, controls the operations of or receives information from: The motor 162, for driving the tractor-drives for feeding and expelling an inserted coupon, as described above with reference to FIGS. 1–4; the cancellation punch and associated solenoid 190; the bar-code optical scanner 188, indicated by pin BCODE in FIG. 9; and the pair of coupon-sensors 160, one sensing "coupon-in" and one sensing "coupon-out", indicated by pins PHINT1 and PHINT2 in FIG. 9. All but the motor 162 are provided on a separate board, shown in FIG. 8 and described below in greater detail. For proper referencing, the main control board is coupled to the secondary board of FIG. 8 via terminal strip J11 of the main board and terminal strip E of the secondary board, while the motor 162 is coupled to the main board at terminal J9. The microprocessor 200 is also coupled to a conventional multi-drop local networking transaction terminal, "Tranz 330", manufactured by VeriFone, Inc. of Redwood City, Calif., via terminal J1, which communicates with a "Tranzit 1800" for subsequent periodic transmission to a coupon-clearing house's main frame computer via a modem. Each "Tranz 330" is also coupled to an ECR, whereby all communication between the ECR and the coupon-reading device is achieved via the "Tranz 330". The flags created by the ECR indicating that a coupon has been credited to a certain item are set up in the "Tranz 330" in response from the ECR directly. This system-arrangement is best seen in FIG. 10. It is noted, that if the coupon-reader device's feed drive, or if the optical scanner thereof were to breakdown, then the bar code data for each coupon may be inputted via a hand-held bar-code wand reader shown in FIG. 10, via terminal strip J2, which inputs the data to the "Tranz 330" for subsequent transmission to the respective ECR via terminal strip J4 of the main board. All of the data of all the store's coupon transactions including all of the registers of that store are stored in the "Transit 1800" for subsequent polling thereof by the coupon-clearing house's main frame. The same data may also be transmitted to the chain-store's central computer so that it may have a log of all transactions, so as to verify the amount credited and reimbursed from the coupon-clearing house, as well as to serve other in-house analyses. The secondary board 202 is shown in FIG. 8, which interfaces with the optical scanner bar-code scanner 188 via terminal strip J8, the coupon "in" and "out" sensors 160', 160" via terminal strip J10, and the solenoid of the punch 192 via the terminal strip J7, all of which are conventional in the art.

While a specific embodiment of the invention has been shown and described, it is to be understood that numerous changes and modifications may be made therein without departing from the scope, spirit and intent of the invention as set forth in the appended claims.

What we claim is:

1. A coupon-redemption system for redeeming and validating coupons at a check-out counter of a supermarket, and the like, comprising, in combination:
   an electronic cash register for totaling purchased goods of a consumer;
   an automatic coupon-reading device for automatically transporting a coupon and reading bar code on a coupon; and
   means coupling said coupon-reading device to said cash register for transferring data therebetween.

2. The system according to claim 1, wherein said means for transferring data comprises a programmable interface means for communicating with said coupon-reader and said cash register; said cash register comprising means for placing said coupon-reader in a ready-mode where the reading of coupons thereby is set via said programmable interface means at the initiation of a check-out procedure.

3. The system according to claim 2, wherein said programmable interface means comprises a transaction terminal through which said cash register and said coupon-reader electronically communicate.

4. The system according to claim 1, wherein said coupon-reader comprises transport means for transporting a coupon therethrough; and a bar-code reader for reading bar-code on a coupon, said transport means transporting a coupon to said bar-code reader for a reading thereof.

5. The system according to claim 4, wherein said coupon-reader further comprises a coupon-in sensing means for sensing the presence of a coupon, said coupon-in sensing means activating said transport means to transport a coupon to said bar-code reader.

6. The system according to claim 5, further comprising means for physically invalidating a coupon after said bar-code reader has read the data thereon.

7. The system according to claim 6, wherein said means for invalidating comprises a punch and means for actuating said punch.

8. The system according to claim 4, wherein said coupon-reader further comprises microprocessor means for controlling the operation of said transport means and said bar-code reader.

9. The system according to claim 6, wherein said coupon-reader further comprises microprocessor means for controlling the sequencing and operation of said transport means, bar-code reader, and means for invalidating.

10. The system according to claim 9, wherein said microprocessor comprises means for determining a valid coupon, for determining the proper operation of said means for invalidating, and for determining the value of a coupon.

11. The system according to claim 1, further comprising a discount coupon comprising a series of bar-code data thereon, said bar-code data comprising the following fields: expiration date data, minimum purchase quantity data, coupon value data, product information data.

12. The system according to claim 11, wherein said coupon bar-code data further comprises the following fields: manufacturer marketing code data unique to the issuer of the coupon; merchant number data allowing redemption of said coupon for a selected merchant.

13. The system according to claim 11, wherein said bar-code data further comprises a begin-data field and an end-data field marking the beginning and ending of the bar-code data for allowing bi-directional reading of said bar-code data, and a special field for identifying said coupon as being compatible with said coupon-reading device.

14. The system according to claim 11, wherein said product-information data comprises a first field of the UPC symbol of the product, and at least a second field limiting said product to at least one other characteristic, such as size of package.

15. The system according to claim 11, wherein said bar-code data is linearly-arranged and located along a side strip of one surface face of said coupon.

16. A coupon-redemption system for redeeming and validating coupons at a check-out counter of a supermarket, and the like, comprising, in combination:
   an electronic cash register for totaling purchased goods of a consumer;
   an automatic coupon-reading device for automatically transporting a coupon therethrough and for reading bar code on a coupon;
   means coupling said automatic coupon-reading device to said cash register for transferring data therebetween;
   said means for transferring data comprising a programmable interface means for communicating with said coupon-reader and said cash register; said cash register comprising means for placing said coupon-reader in a ready-mode where the reading of coupons thereby is set via said programmable interface at the initiation of a check out procedure.

17. The system according to claim 16, wherein said coupon-reader comprises transport means for transporting a coupon therethrough; and a bar-code reader for reading bar-code on a coupon, said transport means transporting a coupon to said bar-code reader for a reading thereof.

18. The system according to claim 16, wherein said coupon-reader further comprises a coupon-in sensing means for sensing the presence of a coupon, said coupon-in sensing means activating said transport means to transport a coupon to said bar-code reader.

19. The system according to claim 16, further comprising means for physically invalidating a coupon after said bar-code reader has read the data thereon.

20. The system according to claim 16, wherein said coupon-reader further comprises microprocessor means for controlling the operation of said transport means and said bar-code reader.

21. The system according to claim 20, wherein said microprocessor comprises means for determining a valid coupon, for determining the proper operation of said means for invalidating, and for determining the value of a coupon.

22. A coupon-reading device for use in stores for automatically reading and transporting a discount coupon, comprising:
   a main housing having a coupon-entranceway by which a coupon is fed thereto;
   means for transporting a coupon from said coupon-entranceway to the interior of said main housing;
   bar-code reading means mounted interiorly in said housing for reading bar-code provided on a coupon;
   means for sensing the presence of a coupon at said coupon-entranceway for activating said means for transporting to transport a coupon into said interior of said main housing for the reading by said bar-code reading means; and control means for controlling the actuation and deactuation of said transport means and said bar-code reading means.

23. The coupon-reading device according to claim 22, wherein said control means comprises a microprocessor.

24. The coupon-reading device according to claim 22, further comprising means for physically invalidating a coupon mounted in said interior of said main housing, said control means also controlling operation of said means for invalidating.

25. The coupon-reading device according to claim 24, further comprising a coupon-out sensor for indicating when a coupon has been ejected into said coupon-entranceway.

26. The coupon-reading device according to claim 22, in combination with a discount coupon comprising a strip of bar-code thereon.

27. The coupon-reading device according to claim 26, wherein said strip of bar-code is positioned along a side of a surface face of said discount coupon; said device further comprising means for physically invalidating a coupon mounted in said interior of said main housing, said control means also controlling operation of said means for invalidating; said means for invalidating being mounted in said interior of said main housing above said strip of bar-code when said discount-coupon is transported thereat; whereby said means for invalidating invalidates said discount-coupon by mutilating at least a portion of said side of said surface face of said coupon containing said strip of bar-code thereon, so that portions of said bar-code are removed.

28. The device according to claim 26, in further combination with an electronic cash register, and means for coupling said coupon-reading device to said electronic cash register for data communication between said coupon-reader device and said register; said register automatically placing said coupon-reader device in its ready mode for receiving discount-coupons via said means for coupling in response to a check-out procedure thereof.

29. The coupon-reading device according to claim 22, wherein said means for transporting comprises an upper tractor-drive assembly, and a lower tractor-drive assembly, a coupon being inserted between said tractor-assemblies for transport; said coupon-entranceway lying at its interior end offset from and between said tractor-assemblies for directing a coupon therebetween; and means for driving at least one of said tractor-assemblies to transport a coupon.

30. A method of automatically crediting discount-coupons at point-of-purchase, comprising the steps of:

(a) tallying up the purchased items on an electric cash register;
(b) feeding discount-coupons into an automatic coupon-reader for verifying and validating the coupons;
(c) reading the bar-code data on the face of coupon;
(d) verifying the correct bar-code format on the discount-coupon;
(e) determining the validity of the discount-coupon for the particular tally from said (a), so that the discount-coupon matches with a product purchased during said step (a); and
(f) automatically crediting the value of each validated coupon from said step (d) to the tally of said step (a) by the cash register;
said step (b) comprises manually inserting a coupon to be read at the entrance of the coupon-reader, and, thereafter, automatically feeding the coupon into the coupon-reader for a preset period of time so that said step (c) may be performed, said step of automatically feeding comprising sensing the presence of a coupon at the entrance of the coupon-reader and, thereafter, transporting the coupon into the coupon-reader.

31. The method according to claim 30, wherein said step (e) comprises rejecting a coupon if it is found to be invalid, and indicating such rejection by physical means.

32. The method according to claim 30, wherein said step (a) comprises placing the coupon-reader in a ready-mode ready to receive and feed coupons.

33. The method according to claim 30, further comprising the step of invalidating the coupon after said step (e) for each valid coupon.

34. The method according to claim 33, wherein said step of invalidating comprises punching a hole through a portion of the bar-code data on the surface face of the discount-coupon to thereby prevent the re-use of such coupon.

35. The method according to claim 33, further comprising the step of verifying the effective carrying out of said step of invalidating.

36. The method according to claim 33, wherein said step (f) comprises sending an invalidate command from the electronic cash register to the coupon-reader to perform said step of invalidating, said step of invalidating being carried out automatically in response to said step of sending.

37. The method according to claim 33, further comprising rejecting the coupon if said step of verifying indicates that said step of invalidating was not carried out.

* * * * *